United States Patent
Asai et al.

(10) Patent No.: US 11,462,727 B2
(45) Date of Patent: Oct. 4, 2022

(54) COMPOSITION FOR NON-AQUEOUS SECONDARY BATTERY FUNCTIONAL LAYER, FUNCTIONAL LAYER FOR NON-AQUEOUS SECONDARY BATTERY, NON-AQUEOUS SECONDARY BATTERY COMPONENT, AND NON-AQUEOUS SECONDARY BATTERY

(71) Applicant: ZEON CORPORATION, Tokyo (JP)

(72) Inventors: Kazuki Asai, Tokyo (JP); Koji Annaka, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 337 days.

(21) Appl. No.: 16/646,571

(22) PCT Filed: Sep. 18, 2018

(86) PCT No.: PCT/JP2018/034479
§ 371 (c)(1),
(2) Date: Mar. 12, 2020

(87) PCT Pub. No.: WO2019/065370
PCT Pub. Date: Apr. 4, 2019

(65) Prior Publication Data
US 2020/0266421 A1    Aug. 20, 2020

(30) Foreign Application Priority Data

Sep. 28, 2017 (JP) .................. 2017-189130

(51) Int. Cl.
| | |
|---|---|
| H01M 4/131 | (2010.01) |
| C08F 220/06 | (2006.01) |
| H01M 4/36 | (2006.01) |
| H01M 4/62 | (2006.01) |
| H01M 10/0525 | (2010.01) |
| H01M 10/0565 | (2010.01) |
| H01M 4/02 | (2006.01) |

(52) U.S. Cl.
CPC .......... *H01M 4/131* (2013.01); *C08F 220/06* (2013.01); *H01M 4/366* (2013.01); *H01M 4/622* (2013.01); *H01M 10/0525* (2013.01); *H01M 10/0565* (2013.01); *H01M 2004/021* (2013.01)

(58) Field of Classification Search
None
See application file for complete search history.

(56) References Cited

U.S. PATENT DOCUMENTS

| | | | |
|---|---|---|---|
| 8,669,337 B2 | 3/2014 | Lu et al. | |
| 2013/0330622 A1 | 12/2013 | Sasaki | |
| 2016/0197327 A1 | 7/2016 | Li et al. | |
| 2017/0062828 A1* | 3/2017 | Sonobe | ................. H01M 4/386 |

FOREIGN PATENT DOCUMENTS

| | | |
|---|---|---|
| CN | 106463732 A | 2/2017 |
| EP | 3598543 A1 | 1/2020 |
| JP | 2013527252 A | 6/2013 |
| JP | 2013145763 A | 7/2013 |
| JP | 2014241197 A | 12/2014 |
| JP | 6083525 B2 | 2/2017 |
| WO | 2012115096 A1 | 8/2012 |
| WO | 2015046090 A1 | 4/2015 |
| WO | 2015186363 A1 | 12/2015 |

OTHER PUBLICATIONS

Mar. 23, 2021, the Extended European Search Report issued by the European Patent Office in the corresponding European Patent Application No. 18861074.5.
Mar. 31, 2020, International Preliminary Report on Patentability issued in the International Patent Application No. PCT/JP2018/034479.
Oct. 23, 2018, International Search Report issued in the International Patent Application No. PCT/JP2018/034479.

* cited by examiner

*Primary Examiner* — Wyatt P McConnell
(74) *Attorney, Agent, or Firm* — Kenja IP Law PC

(57) ABSTRACT

Provided is a composition for a non-aqueous secondary battery functional layer that has excellent slurry stability and can form a functional layer for which sufficient heat shrinkage resistance is ensured. The composition for a non-aqueous secondary battery functional layer contains organic particles, a water-soluble polymer, and water. The organic particles include a polyfunctional monomer unit in a proportion of not less than 20 mass % and not more than 95 mass %, and the water-soluble polymer includes a hydroxyl group-containing structural unit in a proportion of not less than 15 mass % and not more than 100 mass %.

17 Claims, No Drawings

COMPOSITION FOR NON-AQUEOUS SECONDARY BATTERY FUNCTIONAL LAYER, FUNCTIONAL LAYER FOR NON-AQUEOUS SECONDARY BATTERY, NON-AQUEOUS SECONDARY BATTERY COMPONENT, AND NON-AQUEOUS SECONDARY BATTERY

TECHNICAL FIELD

The present disclosure relates to a composition for a non-aqueous secondary battery functional layer, a functional layer for a non-aqueous secondary battery, a non-aqueous secondary battery component, and a non-aqueous secondary battery.

BACKGROUND

Non-aqueous secondary batteries (hereinafter, also referred to simply as "secondary batteries") such as lithium ion secondary batteries have characteristics such as compact size, light weight, high energy-density, and the ability to be repeatedly charged and discharged, and are used in a wide variety of applications.

A secondary battery normally includes non-aqueous secondary battery components (hereinafter, also referred to simply as "battery components") such as electrodes (positive electrode and negative electrode) and a separator that isolates the positive electrode and the negative electrode from one another and prevents short-circuiting between the positive and negative electrodes. There are cases in which a porous membrane layer for improving heat resistance and strength, an adhesive layer aimed at improving adhesiveness between battery components, or the like is provided at the surface of an electrode and/or a separator (hereinafter, "functional layer" may be used as a general term for such layers). Specifically, an electrode that includes an electrode substrate obtained by forming an electrode mixed material layer on a current collector and that further includes a functional layer formed on the electrode substrate or a separator that includes a functional layer formed on a separator substrate may be used as a battery component.

A functional layer may be formed by, for example, applying onto the surface of a substrate, such as an electrode substrate or a separator substrate, a composition for a non-aqueous secondary battery functional layer (hereinafter, also referred to simply as a "composition for a functional layer") in the form of a slurry that contains non-conductive particles such as organic particles and a dispersion medium such as water, and then drying the composition for a functional layer on the substrate (for example, refer to Patent Literature (PTL) 1).

In PTL 1, a protective film disposed between a positive electrode and a negative electrode of an electrical accumulator is produced using a composition that contains a water-soluble polymer, a water-insoluble polymer, and an aqueous medium, and that has a thread forming property, measured by a specific method, of 60% to 85%. According to PTL 1, charge/discharge characteristics of the electrical accumulator can be enhanced by producing the protective film using this composition.

CITATION LIST

Patent Literature

PTL 1: JP 6083525 B

SUMMARY

Technical Problem

However, when the conventional composition for a functional layer described above is stored for a long time, components such as organic particles dispersed in the composition for a functional layer may sediment (i.e., slurry stability may be lost).

Moreover, there has been demand for even higher secondary battery performance in recent years. Specifically, with regards to secondary batteries in which functional layer-containing battery components are used, there is demand for inhibiting functional layer heat shrinkage (i.e., increasing heat shrinkage resistance) so as to sufficiently inhibit short-circuiting between positive and negative electrodes in high-temperature environments and further ensure secondary battery safety.

Accordingly, one objective of the present disclosure is to provide a composition for a non-aqueous secondary battery functional layer that has excellent slurry stability and can form a functional layer for which sufficient heat shrinkage resistance is ensured.

Another objective of the present disclosure is to provide a functional layer for a non-aqueous secondary battery having excellent heat shrinkage resistance, a non-aqueous secondary battery component including this functional layer, and a non-aqueous secondary battery including this battery component.

Solution to Problem

The inventors conducted diligent investigation with the aim of solving the problems described above. The inventors discovered that a composition for a functional layer containing organic particles including a polyfunctional monomer unit in a specific proportion, a water-soluble polymer including a hydroxyl group-containing structural unit in a specific proportion, and water has excellent slurry stability, and that by using this composition for a functional layer, it is possible to form a functional layer having excellent heat shrinkage resistance. In this manner, the inventors completed the present disclosure.

Specifically, the present disclosure aims to advantageously solve the problems set forth above by disclosing a composition for a non-aqueous secondary battery functional layer comprising organic particles, a water-soluble polymer, and water, wherein the organic particles include a polyfunctional monomer unit in a proportion of not less than 20 mass % and not more than 95 mass %, and the water-soluble polymer includes a hydroxyl group-containing structural unit in a proportion of not less than 15 mass % and not more than 100 mass %. A composition for a functional layer that contains organic particles including a polyfunctional monomer unit in a proportion within the range set forth above, a water-soluble polymer including a hydroxyl group-containing structural unit in a proportion within the range set forth above, and water in this manner has excellent slurry stability and can be used to form a functional layer having excellent heat shrinkage resistance.

Note that the phrase "includes a monomer unit" as used with respect to a component formed by a polymer, such as a polymer or organic particles, in the present disclosure, means that "a structural unit (repeating unit) derived from the monomer is included in a polymer obtained using the monomer". Moreover, the "fractional content" of each "structural unit" or "monomer unit" in a polymer can be measured by a nuclear magnetic resonance (NMR) method such as $^1$H-NMR or $^{13}$C-NMR.

Furthermore, when a polymer is referred to as "water-soluble" in the present disclosure, this means that when 0.5 g of the polymer is dissolved in 100 g of water at 25° C., insoluble content is less than 0.5 mass %.

In the presently disclosed composition for a non-aqueous secondary battery functional layer, the water-soluble polymer is preferably non-ionic. By using a water-soluble polymer that is non-ionic, slurry stability of the composition for a functional layer can be further improved.

Note that when a water-soluble polymer is described as "non-ionic" in the present disclosure, this means that when all repeating units of the water-soluble polymer are taken to be 100 mass %, the fractional content of non-ionic repeating units is not less than 99 mass % and not more than 100 mass %.

In the presently disclosed composition for a non-aqueous secondary battery functional layer, the water-soluble polymer preferably has a degree of saponification of not less than 80 mol % and not more than 100 mol %. By using a water-soluble polymer having a degree of saponification within the range set forth above, the occurrence of streaks and uneven coating can be inhibited when the composition for a functional layer is applied onto a substrate to form a functional layer (i.e., coating stability of the composition for a functional layer can be improved).

Note that the "degree of saponification" of a water-soluble polymer referred to in the present disclosure can be measured by a method described in the EXAMPLES section of the present specification.

In the presently disclosed composition for a non-aqueous secondary battery functional layer, the water-soluble polymer preferably has a weight-average molecular weight of not less than 10,000 and not more than 300,000. By using a water-soluble polymer having a weight-average molecular weight within the range set forth above, coating stability of the composition for a functional layer can be improved while also further increasing heat shrinkage resistance of a functional layer.

Note that the "weight-average molecular weight" of a water-soluble polymer referred to in the present disclosure can be measured by a method described in the EXAMPLES section of the present specification.

In the presently disclosed composition for a non-aqueous secondary battery functional layer, the polyfunctional monomer unit is preferably a polyfunctional ethylenically unsaturated monomer unit. By using organic particles including a polyfunctional ethylenically unsaturated monomer unit, heat shrinkage resistance of a functional layer can be further improved.

In the presently disclosed composition for a non-aqueous secondary battery functional layer, the organic particles preferably have a glass-transition temperature of 100° C. or higher. By using organic particles having a glass-transition temperature of this value or higher, heat shrinkage resistance of a functional layer can be further improved.

Note that the "glass-transition temperature" of organic particles referred to in the present disclosure can be measured by a method described in the EXAMPLES section of the present specification.

In the presently disclosed composition for a non-aqueous secondary battery functional layer, the organic particles preferably have a volume-average particle diameter of not less than 50 nm and not more than 500 nm. By using organic particles that have a volume-average particle diameter within the range set forth above, coating stability of the composition for a functional layer can be improved, and heat shrinkage resistance of a functional layer can be further increased. Moreover, the amount of water originating from the organic particles that is imported into a secondary battery can be reduced while also improving cycle characteristics of the secondary battery.

The present disclosure also aims to advantageously solve the problems set forth above by disclosing a functional layer for a non-aqueous secondary battery formed using any one of the compositions for a non-aqueous secondary battery functional layer set forth above. A functional layer obtained using any one of the compositions for a functional layer set forth above in this manner has excellent heat shrinkage resistance.

Moreover, a non-aqueous secondary battery component that includes the presently disclosed functional layer for a non-aqueous secondary battery has excellent heat shrinkage resistance and can be used to obtain a secondary battery for which adequate safety is ensured and that is capable of displaying good battery characteristics such as cycle characteristics.

Advantageous Effect

According to the present disclosure, it is possible to provide a composition for a non-aqueous secondary battery functional layer that has excellent slurry stability and can form a functional layer for which sufficient heat shrinkage resistance is ensured.

Moreover, according to the present disclosure, it is possible to provide a functional layer for a non-aqueous secondary battery having excellent heat shrinkage resistance, a non-aqueous secondary battery component including this functional layer, and a non-aqueous secondary battery including this battery component.

DETAILED DESCRIPTION

The following provides a detailed description of embodiments of the present disclosure.

The presently disclosed composition for a non-aqueous secondary battery functional layer can be used as a material in formation of the presently disclosed functional layer for a non-aqueous secondary battery. Moreover, the presently disclosed functional layer for a non-aqueous secondary battery is formed using the presently disclosed composition for a non-aqueous secondary battery functional layer and constitutes part of a separator or an electrode, for example. Furthermore, the presently disclosed non-aqueous secondary battery component includes the presently disclosed functional layer for a non-aqueous secondary battery. Also, the presently disclosed non-aqueous secondary battery includes at least the presently disclosed non-aqueous secondary battery component.

(Composition for Non-Aqueous Secondary Battery Functional Layer)

The presently disclosed composition for a functional layer is a composition in the form of a slurry that contains organic particles, a water-soluble polymer, and water as a dispersion medium, and that may optionally contain a binder, inorganic particles, and other components. It should be noted that the presently disclosed composition for a functional layer may contain an organic solvent in addition to water as a dispersion medium.

The organic particles contained in the presently disclosed composition for a functional layer include a polyfunctional monomer unit in a proportion of not less than 20 mass % and not more than 95 mass %. Moreover, the water-soluble polymer contained in the presently disclosed composition for a functional layer includes a hydroxyl group-containing structural unit in a proportion of not less than 15 mass % and not more than 100 mass %.

As a result of the presently disclosed composition for a functional layer containing organic particles that include a polyfunctional monomer unit in a proportion of not less than 20 mass % and not more than 95 mass % and a water-soluble polymer that includes a hydroxyl group-containing structural unit in a proportion of not less than 15 mass % and not more than 100 mass %, the presently disclosed composition for a functional layer has excellent slurry stability and can impart excellent heat shrinkage resistance to a functional layer that is obtained from the composition for a functional layer.

<Organic Particles>

The organic particles are particles that are formed by a water-insoluble polymer and are a component that can mainly improve heat shrinkage resistance, strength, and so forth of a functional layer.

<<Chemical Composition>>

The organic particles include a polyfunctional monomer unit in a proportion of not less than 20 mass % and not more than 95 mass % as previously described and also include repeating units other than the polyfunctional monomer unit (other repeating units) in a proportion of not less than 5 mass % and not more than 80 mass %.

[Polyfunctional Monomer Unit]

A monomer that includes two or more groups or structures that can form a cross-linked structure through polymerization can be used, without any specific limitations, as a polyfunctional monomer that can form the polyfunctional monomer unit referred to in the present disclosure. Examples of polyfunctional monomers include monomers that include one ethylenically unsaturated bond and one or more thermally cross-linkable groups per molecule (thermally cross-linkable group-containing monomers); and monomers that include two or more ethylenically unsaturated bonds per molecule (polyfunctional ethylenically unsaturated monomers).

—Thermally Cross-Linkable Group-Containing Monomers—

Examples of thermally cross-linkable groups include an epoxy group, an N-methylol amide group, an oxetanyl group, an oxazoline group, and combinations thereof. Of these thermally cross-linkable groups, an epoxy group is more preferable in terms of ease of cross-linking and cross-link density adjustment.

Examples of monomers including an epoxy group as a thermally cross-linkable group and including an ethylenically unsaturated bond include unsaturated glycidyl ethers such as vinyl glycidyl ether, allyl glycidyl ether, butenyl glycidyl ether, and o-allylphenyl glycidyl ether; monoepoxides of dienes and polyenes such as butadiene monoepoxide, chloroprene monoepoxide, 4,5-epoxy-2-pentene, 3,4-epoxy-1-vinylcyclohexene, and 1,2-epoxy-5,9-cyclododecadiene; alkenyl epoxides such as 3,4-epoxy-1-butene, 1,2-epoxy-5-hexene, and 1,2-epoxy-9-decene; and glycidyl esters of unsaturated carboxylic acids such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexenecarboxylic acid, and glycidyl ester of 4-methyl-3-cyclohexenecarboxylic acid.

Examples of monomers including an N-methylol amide group as a thermally cross-linkable group and including an ethylenically unsaturated bond include (meth)acrylamides that include a methylol group such as N-methylol (meth)acrylamide.

Note that in the present disclosure, "(meth)acryl" is used to indicate "acryl" and/or "methacryl".

Examples of monomers including an oxetanyl group as a thermally cross-linkable group and including an ethylenically unsaturated bond include 3-((meth)acryloyloxymethyl)oxetane, 3-((meth)acryloyloxymethyl)-2-trifluoromethyloxetane, 3-((meth)acryloyloxymethyl)-2-phenyloxetane, 2-((meth)acryloyloxymethyl)oxetane, and 2-((meth)acryloyloxymethyl)-4-trifluoromethyloxetane.

Note that in the present disclosure, "(meth)acryloyl" is used to indicate "acryloyl" and/or "methacryloyl".

Examples of monomers including an oxazoline group as a thermally cross-linkable group and including an ethylenically unsaturated bond include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline.

—Polyfunctional Ethylenically Unsaturated Monomers—

Examples of polyfunctional ethylenically unsaturated monomers include:

polyfunctional (meth)acrylic acid ester monomers such as allyl (meth)acrylate, ethylene glycol di(meth)acrylate, diethylene glycol di(meth)acrylate, triethylene glycol di(meth)acrylate, tetraethylene glycol di(meth)acrylate, and trimethylolpropane tri(meth)acrylate;

polyfunctional aromatic vinyl monomers such as divinylbenzene and diisopropenylbenzene;

dipropylene glycol diallyl ether, polyglycol diallyl ether, triethylene glycol divinyl ether, hydroquinone diallyl ether, tetraallyloxyethane, trimethylolpropane diallyl ether, allyl and vinyl ethers of polyfunctional alcohols other than those listed above, triallylamine, and methylenebisacrylamide.

Note that in the present disclosure, "(meth)acrylate" is used to indicate "acrylate" and/or "methacrylate".

One of these polyfunctional monomers may be used individually, or two or more of these polyfunctional monomers may be used in combination. Of these polyfunctional monomers, polyfunctional ethylenically unsaturated monomers are preferable, polyfunctional (meth)acrylic acid ester monomers are more preferable, and ethylene glycol dimethacrylate and trimethylolpropane trimethacrylate are even more preferable from a viewpoint of further improving heat shrinkage resistance of a functional layer.

The fractional content of the polyfunctional monomer unit in the organic particles when all repeating units of the polymer forming the organic particles are taken to be 100 mass % is required to be not less than 20 mass % and not more than 95 mass %, is preferably 25 mass % or more, more preferably 30 mass % or more, and even more preferably 50 mass % or more, and is preferably 90 mass % or less. If the proportion constituted by the polyfunctional monomer unit in the organic particles is less than 20 mass %, hardness of the organic particles decreases, and heat shrinkage resistance of a functional layer is lost. On the other hand, if the proportion constituted by the polyfunctional monomer unit in the organic particles is more than 95 mass %, fine particles increase due to reduced polymerization stability in production of the organic particles, and secondary battery cycle characteristics are lost.

[Other Repeating Units]

Examples of the other repeating units included in the organic particles include, but are not specifically limited to, a monofunctional (meth)acrylic acid ester monomer unit and an acidic group-containing monomer unit.

—Monofunctional (meth)acrylic Acid Ester Monomer Unit—

Examples of (meth)acrylic acid ester monomers that can form the monofunctional (meth)acrylic acid ester monomer unit include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate.

One of these (meth)acrylic acid ester monomers may be used individually, or two or more of these (meth)acrylic acid ester monomers may be used in combination. Of these (meth)acrylic acid ester monomers, methyl acrylate, ethyl acrylate, n-butyl acrylate, 2-ethylhexyl acrylate, methyl methacrylate, ethyl methacrylate, n-butyl methacrylate, and 2-ethylhexyl methacrylate are preferable, and n-butyl acrylate is more preferable.

—Acidic Group-Containing Monomer Unit—

Examples of acidic group-containing monomers that can form the acidic group-containing monomer unit include carboxy group-containing monomers, sulfo group-containing monomers, and phosphate group-containing monomers.

Examples of carboxy group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Moreover, an acid anhydride that produces a carboxy group through hydrolysis can be used as a carboxy group-containing monomer.

Examples of sulfo group-containing monomers include styrene sulfonic acid, vinyl sulfonic acid (ethylene sulfonic acid), methyl vinyl sulfonic acid, (meth)allyl sulfonic acid, and 3-allyloxy-2-hydroxypropane sulfonic acid.

Note that in the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)acryloyl" is used to indicate "acryloyl" and/or "methacryloyl".

One of these acidic group-containing monomers may be used individually, or two or more of these acidic group-containing monomers may be used in combination. Of these acidic group-containing monomers, carboxy group-containing monomers are preferable, and acrylic acid and methacrylic acid are more preferable.

The fractional content of other repeating units in the organic particles when all repeating units of the polymer forming the organic particles are taken to be 100 mass % is required to be not less than 5 mass % and not more than 80 mass %, is preferably 10 mass % or more, and is preferably 70 mass % or less. If the proportion constituted by other repeating units in the organic particles is less than 5 mass %, fine particles increase due to reduced polymerization stability in production of the organic particles, and secondary battery cycle characteristics are lost. On the other hand, if the proportion constituted by other repeating units in the organic particles is more than 80 mass %, hardness of the organic particles decreases, and heat shrinkage resistance of a functional layer is lost.

<<Production Method>>

The organic particles can be produced through polymerization of a monomer composition containing the monomers described above, carried out in an aqueous solvent such as water, for example. In the polymerization, the fractional content of each monomer in the monomer composition can be set in accordance with the fractional content of each repeating unit in the organic particles.

The polymerization method is not specifically limited and may, for example, be any of solution polymerization, suspension polymerization, bulk polymerization, and emulsion polymerization. Moreover, ionic polymerization, radical polymerization, living radical polymerization, or the like may be adopted as the polymerization reaction. In the polymerization, seed particles may be used to perform seeded polymerization. The polymerization conditions can be adjusted as appropriate depending on the polymerization method and so forth.

Known additives such as emulsifiers, polymerization initiators, and chain transfer agents can be used in the polymerization and the amount thereof may be the same as typically used.

<<Volume-Average Particle Diameter>>

The volume-average particle diameter of the organic particles obtained as described above is preferably 50 nm or more, and more preferably 100 nm or more, and is preferably 500 nm or less, and more preferably 400 nm or less. When the volume-average particle diameter of the organic particles is 50 nm or more, the amount of water originating from the organic particles that is imported into a secondary battery can be reduced due to the specific surface area of the organic particles being reduced, and secondary battery cycle characteristics can be improved. On the other hand, when the volume-average particle diameter of the organic particles is 500 nm or less, coating stability of the composition for a functional layer can be increased, and a functional layer can be densified and provided with even better heat shrinkage resistance.

Note that the volume-average particle diameter of the organic particles can be adjusted by altering the type and amount of a polymerization initiator, chain transfer agent, and/or emulsifier used in production of the organic particles, for example.

<<Glass-Transition Temperature>>

The glass-transition temperature of the organic particles obtained as described above is preferably 100° C. or higher, more preferably 110° C. or higher, more preferably 150° C. or higher, and even more preferably 200° C. or higher. When the glass-transition temperature of the organic particles is 100° C. or higher, heat shrinkage resistance of a functional layer can be further improved. Although no specific limitations are placed on the upper limit of the glass-transition temperature of the organic particles, the glass-transition temperature of the organic particles is normally 500° C. or lower.

Note that the glass-transition temperature of the organic particles can be adjusted by altering the types and proportions of monomers used in production of the organic particles, for example.

<Water-Soluble Polymer>

The water-soluble polymer is a component that can mainly contribute to improving coating stability and slurry stability of the composition for a functional layer. A sodium salt of carboxymethyl cellulose or the like is conventionally used to enable good application onto a substrate of a composition for a functional layer that contains non-conductive particles, such as organic particles, in water. However, studies conducted by the inventors have revealed that there are cases in which the use of a sodium salt of carboxymethyl cellulose leads to loss of slurry stability, such as through sedimentation of organic particles in a composition for a functional layer due to aggregation of the organic particles. This reduction of slurry stability is particularly noticeable in a case in which the organic particles have a comparatively small volume-average particle diameter (for example, 500 nm or less). In contrast, by using a water-soluble polymer that includes a hydroxyl group-containing structural unit in a proportion of not less than 15 mass % and not more than 100 mass %, it is possible to ensure sufficient slurry stability of a composition for a functional layer containing the specific organic particles set forth above while also enabling good application of the composition for a functional layer onto a substrate. Moreover, heat shrinkage resistance of a functional layer can be significantly improved using a composition for a functional layer that contains the organic particles set forth above and the water-soluble polymer set forth above. This is presumed to be a result of the specific organic particles, which contribute to improving heat shrinkage resistance, being well distributed, without unevenness, in a functional layer obtained from the presently disclosed composition for a functional layer, due to the contribution of the water-soluble polymer set forth above.

<<Chemical Composition>>

The water-soluble polymer includes a hydroxyl group-containing structural unit in a proportion of not less than 15 mass % and not more than 100 mass % as previously described. The water-soluble polymer may optionally include repeating units other than the hydroxyl group-containing structural unit (other repeating units) in a proportion of 85 mass % or less.

[Hydroxyl Group-Containing Structural Unit]

No specific limitations are placed on the structure of the hydroxyl group-containing structural unit so long as it is a repeating unit that includes a hydroxyl group. Examples of methods by which the hydroxyl group-containing structural unit can be introduced into the water-soluble polymer include the following methods (1) and (2).

(1) A method in which a polymer is produced from a monomer composition containing a carboxylic acid vinyl ester monomer represented by a general formula: R—CO—O—CH=CH$_2$ (in the formula, R may be any structure but is preferably an alkyl group having a carbon number of not less than 1 and not more than 19), and the polymer is saponified to convert R—CO—O— of a carboxylic acid vinyl ester monomer unit to a hydroxyl group and produce a water-soluble polymer including a vinyl alcohol unit (2) A method in which a water-soluble polymer including a hydroxyl group-containing monomer unit is produced from a monomer composition containing a hydroxyl group-containing monomer Of these methods, method (1) is preferable because it enables simple production of a water-soluble polymer in which the fractional content of a hydroxyl group-containing structural unit is high.

Examples of the carboxylic acid vinyl ester monomer used in method (1) include vinyl acetate, vinyl propionate, vinyl butyrate, vinyl caproate, vinyl caprylate, vinyl caprate, vinyl laurate, vinyl myristate, vinyl palmitate, and vinyl stearate. One of these carboxylic acid vinyl ester monomers may be used individually, or two or more of these carboxylic acid vinyl ester monomers may be used in combination. Of these carboxylic acid vinyl ester monomers, vinyl acetate is preferable.

Examples of the hydroxyl group-containing monomer used in method (2) include ethylenically unsaturated alcohols such as (meth)allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacryl ate, 2-hydroxypropyl methacrylate, di-2-hydroxyethyl maleate, di-4-hydroxybutyl maleate, and di-2-hydroxypropyl itaconate; esters of (meth) acrylic acid and polyalkylene glycol represented by a general formula CH$_2$=CR$^1$—COO—(C$_q$H$_{2q}$O)$_p$—H (where p represents an integer of 2 to 9, q represents an integer of 2 to 4, and R$^1$ represents hydrogen or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono (meth)allyl ether and dipropylene glycol mono(meth)allyl ether; mono(meth)allyl ethers of halogen or hydroxy substituted (poly)alkylene glycols such as glycerin mono(meth) allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; (meth) allyl thioethers of alkylene glycols such as (meth)allyl-2-hydroxyethyl thioether and (meth)allyl-2-hydroxypropyl thioether; and 2-hydroxyethyl (meth)acrylamide. One of these hydroxyl group-containing monomers may be used individually, or two or more of these hydroxyl group-containing monomers may be used in combination. Of these hydroxyl group-containing monomers, 2-hydroxyethyl acrylamide is preferable.

The fractional content of the hydroxyl group-containing structural unit in the water-soluble polymer when all repeating units of the water-soluble polymer are taken to be 100 mass % is required to be not less than 15 mass % and not more than 100 mass %, and is preferably 35 mass % or more, more preferably 50 mass % or more, and even more preferably 70 mass % or more. If the fractional content of the hydroxyl group-containing structural unit in the water-soluble polymer is less than 15 mass %, slurry stability of the composition for a functional layer is lost.

[Other Repeating Units]

No specific limitations are placed on other repeating units that are optionally included in the water-soluble polymer. Examples of monomers that can form other repeating units include (meth)acrylamide monomers (acrylamide, methacrylamide, dimethylacrylamide, etc.), acidic group-containing monomers such as previously described in the "Organic particles" section, N-vinylformamide, N-vinylacetamide, vinylpyrrolidone, and (meth)acryloylmorpholine. In a case in which the hydroxyl group-containing structural unit is introduced into the water-soluble polymer by method (1), a carboxylic acid vinyl ester monomer unit may remain as another repeating unit in the water-soluble polymer obtained after saponification.

The fractional content of other repeating units in the water-soluble polymer when all repeating units of the water-soluble polymer are taken to be 100 mass % is required to be 85 mass % or less, and is preferably 50 mass % or less, and more preferably 15 mass % or less. If the fractional content of other repeating units in the water-soluble polymer is more than 85 mass %, slurry stability of the composition for a functional layer is lost.

In particular, the fractional content of an acidic group-containing monomer unit in the water-soluble polymer when all repeating units of the water-soluble polymer are taken to be 100 mass % is preferably 40 mass % or less, more preferably 20 mass % or less, even more preferably 5 mass % or less, particularly preferably 1 mass % or less, and most preferably 0 mass %. An acidic group-containing monomer unit is a repeating unit that can improve the water solubility of a polymer in the same way as a hydroxyl group-containing structural unit, but tends to increase the amount of water that is introduced into a secondary battery compared to a hydroxyl group-containing structural unit. Accordingly, the amount of water that is imported into a secondary battery can be reduced and secondary battery cycle characteristics can be improved by setting the fractional content of an acidic group-containing monomer in the water-soluble polymer as 40 mass % or less.

<<Production Method>>

No specific limitations are placed on the method by which the water-soluble polymer is produced. For example, the water-soluble polymer can be produced as an addition polymer by polymerizing a monomer composition containing the monomers described above to obtain a polymer, and subsequently performing saponification of the obtained polymer as necessary.

In the polymerization, the fractional content of each monomer in the monomer composition can be set in accordance with the fractional content of each repeating unit in the water-soluble polymer.

The polymerization method is not specifically limited and may, for example, be any of solution polymerization, suspension polymerization, bulk polymerization, and emulsion polymerization. Moreover, ionic polymerization, radical polymerization, living radical polymerization, or the like may be adopted as the polymerization reaction. The polymerization conditions can be adjusted as appropriate depending on the polymerization method and so forth.

Moreover, known additives such as polymerization initiators and chain transfer agents can be used in the polymerization and the amount thereof may be the same as typically used.

Furthermore, any known method can be used as the method of saponification without any specific limitations.

<<Electrical Character in Water>>

Although the water-soluble polymer obtained as described above may be anionic, cationic, or non-ionic, the water-soluble polymer is preferably non-ionic. By using a water-soluble polymer that is non-ionic, ionic strength in the composition for a functional layer can be reduced, and slurry stability of the composition for a functional layer can be further improved.

A water-soluble polymer that is non-ionic includes non-ionic repeating units in a proportion of not less than 99 mass % and not more than 100 mass % when all repeating units of the water-soluble polymer are taken to be 100 mass % as previously described. The term "non-ionic repeating unit" as used in the present disclosure refers to a repeating unit that does not include an ionic functional group such as an acidic group (carboxy group, sulfo group, phosphate group, etc.) or a basic group (amino group). Examples of non-ionic repeating units include a hydroxyl group-containing structural unit, a (meth)acrylamide monomer unit, a carboxylic acid vinyl ester monomer unit, a cross-linkable monomer unit, a monofunctional (meth)acrylic acid ester monomer unit, an N-vinylformamide unit, an N-vinylacetamide unit, a vinylpyrrolidone unit, and a (meth)acryloylmorpholine unit.

<<Weight-Average Molecular Weight>>

The weight-average molecular weight of the water-soluble polymer obtained as described above is preferably 10,000 or more, more preferably 22,000 or more, even more preferably 30,000 or more, and particularly preferably 40,000 or more, and is preferably 300,000 or less, more preferably 200,000 or less, even more preferably 100,000 or less, particularly preferably 75,000 or less, and most preferably less than 50,000. When the weight-average molecular weight of the water-soluble polymer is 10,000 or more, functional layer rigidity increases, and heat shrinkage resistance can be further improved. On the other hand, when the weight-average molecular weight of the water-soluble polymer is 300,000 or less, thickening of the composition for a functional layer can be inhibited, and coating stability of the composition for a functional layer can be increased.

Note that the weight-average molecular weight of the water-soluble polymer can be adjusted as appropriate by altering the polymerization conditions (type and amount of polymerization initiator, etc.).

<<Degree of Saponification>>

The degree of saponification of the water-soluble polymer obtained as described above (particularly in a case in which the water-soluble polymer is obtained through saponification) is preferably 80 mol % or more, more preferably 85 mol % or more, and even more preferably 90 mol % or more. When the degree of saponification of the water-soluble polymer is 80 mol % or more, thickening of the composition for a functional layer can be inhibited, and coating stability of the composition for a functional layer can be increased. No specific limitations are placed on the upper limit of the degree of saponification, which may be 100 mol % or less.

Note that the degree of saponification of the water-soluble polymer can be adjusted as appropriate by altering the saponification conditions.

<<Amount>>

Although no specific limitations are placed on the amount of the water-soluble polymer in the composition for a functional layer, the amount of the water-soluble polymer per 100 parts by mass of the organic particles is preferably 0.1 parts by mass or more, more preferably 0.2 parts by mass or more, even more preferably 2 parts by mass or more, and particularly preferably 5 parts by mass or more, and is preferably 15 parts by mass or less, and more preferably 10 parts by mass or less. When the amount of the water-soluble polymer in the composition for a functional layer is 0.1 parts by mass or more per 100 parts by mass of the organic particles, coating stability of the composition for a functional layer can be improved, and slurry stability of the composition for a functional layer can be further increased. On the other hand, when the amount of the water-soluble polymer in the composition for a functional layer is 15 parts by mass or less per 100 parts by mass of the organic particles, sufficient heat shrinkage resistance of a functional layer can be ensured.

<Binder>

The presently disclosed composition for a functional layer may contain a binder. The binder is a component that is formed by a polymer and that, in a functional layer formed using the composition for a functional layer, can hold components contained in the functional layer, such as the organic particles, so that these components do not become detached from the functional layer.

<<Type>>

The binder that is optionally contained in the composition for a functional layer may be a known particulate polymer (excluding those corresponding to the previously described organic particles) that is water-insoluble and can be dispersed in a dispersion medium (for example, water), such as a thermoplastic elastomer. The thermoplastic elastomer may, for example, be an acrylic polymer (polymer including a monofunctional (meth)acrylic acid ester monomer unit), isoprene rubber (IR), natural rubber (NR), nitrile rubber (NBR) (polymer including an acrylonitrile unit and a butadiene unit), or styrene-butadiene rubber (SBR) (polymer including a styrene unit and a butadiene unit).

One of these thermoplastic elastomers may be used individually, or two or more of these thermoplastic elastomers may be used in combination. Of these thermoplastic elastomers, an acrylic polymer is preferable.

<<Glass-Transition Temperature>>

The glass-transition temperature of the binder is preferably −40° C. or higher, and is preferably 0° C. or lower, and more preferably −15° C. or lower. When the glass-transition temperature of the binder is −40° C. or higher, blocking of a battery component that includes a functional layer can be inhibited. On the other hand, when the glass-transition temperature of the binder is 0° C. or lower, sufficient functional layer adhesiveness can be ensured.

Note that the glass-transition temperature of the binder can be adjusted by altering the types and proportions of monomers used in production of the binder, for example. The glass-transition temperature of the binder can be raised by increasing the proportion in which acrylonitrile or an aromatic monovinyl monomer, such as styrene, is used in production of the binder, for example, and can be lowered by decreasing this proportion, for example.

<<Amount>>

Although no specific limitations are placed on the amount of the binder in the composition for a functional layer, the amount of the binder per 100 parts by mass of the organic particles is preferably 1 part by mass or more, and more preferably 5 parts by mass or more, and is preferably 20 parts by mass or less, and more preferably 15 parts by mass or less.

<Inorganic Particles>

The presently disclosed composition for a functional layer may contain inorganic particles. The inorganic particles are a component that, as non-conductive particles, can mainly improve heat shrinkage resistance, strength, and so forth of a functional layer in the same way as the previously described organic particles.

<<Type>>

Examples of the inorganic particles that may optionally be contained in the composition for a functional layer include particles of oxides such as aluminum oxide (alumina), hydrates of aluminum oxide (boehmite (AlOOH) and gibbsite ($Al(OH)_3$)), silicon oxide, magnesium oxide (magnesia), calcium oxide, titanium oxide (titania), barium titanate ($BaTiO_3$), ZrO, and alumina-silica complex oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite. These particles may be subjected to element substitution, surface treatment, solid solution treatment, or the like as necessary. One of these types of inorganic particles may be used individually, or two or more of these types of inorganic particles may be used in combination. Of these inorganic particles, boehmite particles, barium sulfate particles, and alumina particles are preferable.

<<Amount>>

No specific limitations are placed on the amount of the inorganic particles in the composition for a functional layer. However, from a viewpoint of inhibiting an increase in the amount of water imported into a secondary battery due to bound water at the surface of the inorganic particles or hydration water while also sufficiently improving slurry stability of the composition for a functional layer and enhancing secondary battery cycle characteristics, the amount of the inorganic particles per 100 parts by mass of the organic particles is preferably 100 parts by mass or less, more preferably 50 parts by mass or less, even more preferably 30 parts by mass or less, and particularly preferably 10 parts by mass or less.

<Other Components>

No specific limitations are placed on components other than the organic particles, water-soluble polymer, binder, inorganic particles, and dispersion medium such as water that may be contained in the composition for a functional layer. Examples of such components include known additives. Components such as surface tension modifiers, dispersants, viscosity modifiers, wetting agents, reinforcing materials, and additives for electrolyte solution can be used without any specific limitations as the known additives. These components are not specifically limited so long as they do not affect battery reactions and may be selected from commonly known components such as those described in WO 2012/115096 A1, for example. Moreover, one of these other components may be used individually, or two or more of these other components may be used in combination in a freely selected ratio.

<Production Method of Composition for Non-Aqueous Secondary Battery Functional Layer>

The presently disclosed composition for a functional layer can, without any specific limitations other than that the specific organic particles and water-soluble polymer described above and water as a dispersion medium are included, be produced by stirring and mixing the organic particles, the water-soluble polymer, and the binder, inorganic particles, and other components that may optionally be added, in the presence of water. Note that in a case in which a dispersion liquid of the organic particles or an aqueous solution of the water-soluble polymer is used in production of the composition for a functional layer, water contained in the dispersion liquid and/or aqueous solution may be used as the dispersion medium of the composition for a functional layer.

The method of stirring is not specifically limited and may be any known method. Specifically, the composition for a functional layer can be produced in slurry form by mixing the previously described components and a dispersion medium including water using a typical stirring vessel, ball mill, sand mill, bead mill, pigment disperser, ultrasonic disperser, grinding machine, homogenizer, planetary mixer, FILMIX, or the like. Mixing of the components and the dispersion medium including water can normally be carried out in a temperature range of room temperature to 80° C. for a period of 10 minutes to several hours.

(Functional Layer for Non-Aqueous Secondary Battery)

The presently disclosed functional layer is a layer that is formed from the composition for a functional layer set forth above. The presently disclosed functional layer can be formed by, for example, applying the composition for a functional layer set forth above onto the surface of a suitable substrate to form a coating film, and then drying the coating film that is formed. In other words, the presently disclosed functional layer is formed by a dried product of the composition for a functional layer set forth above, contains the previously described organic particles and water-soluble polymer, and may optionally contain the previously described binder, inorganic particles, and other components. Note that a component such as the organic particles may be cross-linked during drying of the composition for a functional layer or may be cross-linked during heat treatment or the like that is optionally performed after drying (i.e., the presently disclosed functional layer may contain a cross-linked product of the organic particles, for example). Each component contained in the functional layer is a component that was contained in the composition for a functional layer and the preferred ratio of each component is the same as the preferred ratio of the component in the composition for a functional layer.

As a result of the presently disclosed functional layer being formed using the composition for a functional layer set forth above, the presently disclosed functional layer has excellent heat shrinkage resistance, and the occurrence of streaks and uneven coating is inhibited. Consequently, it is possible to obtain a secondary battery for which adequate battery characteristics such as cycle characteristics are ensured through use of a battery component that includes the functional layer.

<Substrate>

No limitations are placed on the substrate onto which the composition for a functional layer is applied. For example, a coating film of the composition for a functional layer may be formed on the surface of a releasable substrate, the coating film may be dried to form a functional layer, and then the releasable substrate may be peeled from the functional layer. The functional layer that is peeled from the releasable substrate in this manner can be used as a free-standing film in formation of a battery component of a secondary battery. Specifically, the functional layer that is peeled from the releasable substrate may be stacked on a separator substrate to form a separator including the functional layer or may be stacked on an electrode substrate to form an electrode including the functional layer.

However, it is preferable that a separator substrate or an electrode substrate is used as the substrate from a viewpoint of raising battery component production efficiency since a step of peeling the functional layer can be omitted.

<<Separator Substrate>>

The separator substrate is not specifically limited and may be a known separator substrate such as an organic separator substrate. The organic separator substrate is a porous member that is made from an organic material. For example, the organic separator substrate may be a microporous membrane or non-woven fabric containing a polyolefin resin such as polyethylene or polypropylene, or an aromatic polyamide resin, and is preferably a microporous membrane or non-woven fabric made from polyethylene due to the excellent strength thereof. Although the separator substrate may be of any thickness, the thickness thereof is preferably not less than 5 μm and not more than 30 μm, more preferably not less than 5 μm and not more than 20 μm, and even more preferably not less than 5 μm and not more than 18 μm. A separator substrate thickness of 5 μm or more ensures adequate safety. Moreover, a separator substrate thickness of 30 μm or less can inhibit reduction of ion conductivity, inhibit deterioration of secondary battery output characteristics, inhibit increase of heat shrinkage force of the separator substrate, and increase heat resistance.

<<Electrode Substrate>>

The electrode substrate (positive/negative electrode substrate) is not specifically limited and may, for example, be an electrode substrate obtained by forming an electrode mixed material layer on a current collector.

Note that the current collector, the electrode active material (positive/negative electrode active material) and the binder for an electrode mixed material layer (binder for positive/negative electrode mixed material layer) in the electrode mixed material layer, and the method by which the electrode mixed material layer is formed on the current collector may be known examples thereof such as described in JP 2013-145763 A, for example.

<Formation Method of Functional Layer for Non-Aqueous Secondary Battery>

Examples of methods by which the functional layer may be formed on a substrate such as the separator substrate or electrode substrate described above include:

(1) a method in which the presently disclosed composition for a functional layer is applied onto the surface of a separator substrate or an electrode substrate (surface at the electrode mixed material layer side in the case of an electrode substrate; same applies below) and is then dried;

(2) a method in which a separator substrate or an electrode substrate is immersed in the presently disclosed composition for a functional layer and is then dried; and (3) a method in which the presently disclosed composition for a functional layer is applied onto a releasable substrate and is dried to produce a functional layer that is then transferred onto the surface of a separator substrate or an electrode substrate.

Of these methods, method (1) is particularly preferable since it allows simple control of the thickness of the functional layer. In more detail, method (1) includes a step of applying the composition for a functional layer onto a substrate (application step) and a step of drying the composition for a functional layer that has been applied onto the substrate to form a functional layer (functional layer formation step).

Note that the functional layer may be formed at one side or both sides of a separator substrate or an electrode substrate depending on the structure of the secondary battery that is to be produced. In a case in which a separator substrate is used as the substrate, the functional layer is preferably formed at both sides of the separator substrate, whereas in a case in which an electrode substrate is used as the substrate, the functional layer is preferably formed at one side of the electrode substrate, and particularly on the electrode mixed material layer.

<<Application Step>>

Examples of methods by which the composition for a functional layer can be applied onto the substrate in the application step include, but are not specifically limited to, doctor blading, reverse roll coating, direct roll coating, gravure coating, extrusion coating, and brush coating.

<<Functional Layer Formation Step>>

The method by which the composition for a functional layer on the substrate is dried in the functional layer formation step is not specifically limited and may be a commonly known method. Examples of drying methods that can be used include drying by warm, hot, or low-humidity air, drying in a vacuum, and drying through irradiation with infrared light, electron beams, or the like. Although no specific limitations are placed on the drying conditions, the drying temperature is preferably 40° C. to 150° C., and the drying time is preferably 2 minutes to 30 minutes.

<Thickness of Functional Layer>

The thickness of each functional layer formed on the substrate is preferably 0.1 μm or more, more preferably 0.2 μm or more, and even more preferably 0.3 μm or more, and is preferably 5 μm or less, more preferably 2 μm or less, and even more preferably 1 μm or less. When the thickness of the functional layer is 0.1 μm or more, sufficient heat shrinkage resistance of the functional layer can be ensured. On the other hand, when the thickness of the functional layer is 5 μm or less, this can contribute to improving secondary battery capacity through thinning of the functional layer.

The "thickness" of a functional layer referred to in the present disclosure can be measured by a method described in the EXAMPLES section of the present specification.

(Non-Aqueous Secondary Battery Component)

The presently disclosed battery component includes the presently disclosed functional layer set forth above. By using this battery component, it is possible to obtain a secondary battery for which adequate safety is ensured and that can display good battery characteristics such as cycle characteristics.

The presently disclosed battery component normally includes a substrate and the presently disclosed functional layer set forth above. Specifically, the presently disclosed battery component may, for example, be a separator that includes a separator substrate and the presently disclosed functional layer or an electrode that includes an electrode substrate and the presently disclosed functional layer. The electrode substrate and the separator substrate may be the same as any of those described in the "Functional layer for non-aqueous secondary battery" section.

The presently disclosed battery component (separator or electrode) may include constituent elements other than a separator substrate or an electrode substrate and the presently disclosed functional layer so long as the effects disclosed herein are not significantly lost.

(Non-Aqueous Secondary Battery)

The presently disclosed secondary battery includes the presently disclosed battery component set forth above. More specifically, the presently disclosed secondary battery includes a positive electrode, a negative electrode, a separator, and an electrolyte solution, wherein the presently disclosed battery component is used as at least one selected from the group consisting of the positive electrode, the negative electrode, and the separator.

<Positive Electrode, Negative Electrode, and Separator>

At least one of the positive electrode, the negative electrode, and the separator used in the presently disclosed secondary battery is the presently disclosed battery component as described above. In other words, at least one of the positive electrode, the negative electrode, and the separator in the presently disclosed secondary battery includes the presently disclosed functional layer.

Moreover, an electrode composed of an electrode substrate such as previously described or a separator composed of a separator substrate such as previously described may be used, without any specific limitations, as a positive electrode, negative electrode, or separator that does not include a functional layer.

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. Note that one electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

No specific limitations are placed on the organic solvent used in the electrolyte solution so long as the supporting electrolyte can dissolve therein. Examples of suitable organic solvents in the case of a lithium ion secondary battery, for example, include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having a high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Production Method of Non-Aqueous Secondary Battery>

The presently disclosed non-aqueous secondary battery set forth above can be produced by, for example, stacking the positive electrode and the negative electrode with the separator in-between, performing rolling, folding, or the like of the resultant laminate as necessary to place the laminate in a battery container, injecting the electrolyte solution into the battery container, and sealing the battery container. Note that at least one battery component among the positive electrode, the negative electrode, and the separator is a functional layer-equipped battery component. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may, for example, be a coin type, a button type, a sheet type, a cylinder type, a prismatic type, or a flat type.

EXAMPLES

The following provides a more specific description of the present disclosure based on examples. However, the present disclosure is not limited to the following examples. In the following description, "%" and "parts" used in expressing quantities are by mass, unless otherwise specified. Moreover, in a polymer that is produced through copolymerization of a plurality of types of monomers, the "fractional content of a monomer unit" formed through polymerization of a given monomer is normally, unless otherwise specified, the same as the ratio (charging ratio) of the given monomer among all monomers used in polymerization of the polymer.

In the examples and comparative examples, the glass-transition temperature and volume-average particle diameter of organic particles and a binder, the degree of saponification and weight-average molecular weight of a water-soluble polymer, the coating stability and slurry stability of a composition for a functional layer, the thickness, water content, and heat shrinkage resistance of a functional layer, and the cycle characteristics of a secondary battery were evaluated by the following methods.

<Glass-Transition Temperature (Tg)>

A water dispersion of organic particles and a water dispersion of a binder were each dried at 25° C. for 24 hours to obtain a measurement sample.

Next, 10 mg of the measurement sample was weighed into an aluminum pan, and a DSC curve was measured under normal temperature and humidity using a differential scanning calorimeter (EXSTAR DSC6220 produced by SIT NanoTechnology Inc.) with a measurement temperature range of −100° C. to 200° C. and a heating rate of 10° C./min, and with an empty aluminum pan as a reference. In the heating process, the glass-transition temperature (Tg) was determined as a point of intersection of a baseline directly before a heat absorption peak on the DSC curve at which a derivative signal (DDSC) reached 0.05 mW/min/mg or more and a tangent to the DSC curve at a first inflection point to appear after the heat absorption peak.

<Volume-Average Particle Ddiameter>

A water dispersion of organic particles and a water dispersion of a binder were each adjusted to a solid content concentration of 0.1% to prepare a water dispersion for measurement. The water dispersion for measurement was then used to measure a particle diameter distribution with a laser diffraction particle diameter distribution analyzer (produced by Beckman Coulter Inc.; product name: LS-230). In the measured particle diameter distribution, the particle diameter at which cumulative volume calculated from a small-diameter end of the distribution reached 50% was taken to be the volume-average particle diameter (D50).

<Degree of Saponification>

The degree of saponification of a water-soluble polymer was measured in accordance with a method described in "Testing methods for polyvinyl alcohol" of "JIS K 6726".

<Weight-Average Molecular Weight>

Weight-average molecular weights were measured under the following conditions.

Apparatus: Gel permeation chromatograph (GPC)

Column: Guard column PWXL×1, GMPWXL×1, G2500PWXL×1 (temperature: 45° C.) produced by Tosoh Corporation Eluent: 0.1 mol/L Sodium nitrate aqueous solution Flow rate: 0.5 mL/min Detector: Differential refractive index detector RI-201 (sensitivity 16) produced by Showa Denko K.K.

Standard material: Monodisperse polyethylene oxide, polyethylene glycol

Measurement sample: Filtrate measured after using a 0.45 μm filter to filter a sample adjusted to 0.3% with eluent <Coating Stability>

In each of Examples 1 to 9 and 11, and Comparative Examples 1 to 4, an obtained composition for a functional layer was applied onto a polyethylene separator substrate (produced by Asahi Kasei Corporation; product name: MD412) and was dried at 50° C. for 3 minutes to obtain a battery component (separator) for evaluation including a functional layer (thickness: 0.5 μm) at one side. In Example 10, an obtained composition for a functional layer was applied onto an obtained negative electrode substrate and was dried at 50° C. for 3 minutes to obtain a battery component (negative electrode) for evaluation including a functional layer (thickness: 0.5 μm) at one side.

Ten A4-size (210 mm×297 mm) test specimens were cut out from each battery component for evaluation obtained as described above. The surface at the functional layer side of each test specimen was inspected by the naked eye and was evaluated by the following standard. Observation of less streaking and uneven coating indicates that the composition for a functional layer has better coating stability.

A: Streaks and/or uneven coating observed in 2 or fewer test specimens

B: Streaks and/or uneven coating observed in not fewer than 3 and not more than 5 test specimens C: Streaks and/or uneven coating observed in 6 or more test specimens <Slurry Stability>

After loading 100 mL of a composition for a functional layer into a graduated cylinder having a capacity of 100 mL and leaving the composition for a functional layer at rest, the external appearance of the composition for a functional layer was observed at intervals of 1 hour. The time required for a clear layer of 5 mm or more in width in a vertical direction to appear at the top of the composition for a functional layer was taken to be the sedimentation time and was evaluated by the following standard. A longer sedimentation time indicates that the composition for a functional layer has better slurry stability.

A: Sedimentation time of 24 hours or more

B: Sedimentation time of not less than 12 hours and less than 24 hours

C: Sedimentation time of less than 12 hours

<Thickness>

The thickness of a functional layer was calculated by subtracting the thickness of a substrate (separator substrate or electrode substrate) without a functional layer formed thereon from the thickness of a battery component obtained by stacking the functional layer and the substrate. Note that the thicknesses of the battery component and the substrate were each determined by measuring the thickness thereof at 10 arbitrary points using a contact-type thickness meter (Digimatic Indicator Code No. 543-575 produced by Mitutoyo Corporation), and then calculating an average value of the measured thicknesses.

<Water Content>

A composition for a functional layer was applied onto a polyethylene separator substrate (produced by Asahi Kasei Corporation; product name: MD412) and was dried at 50° C. for 3 minutes to obtain a separator for evaluation including a functional layer (thickness: 0.5 μm) at one side.

The produced separator for evaluation was cut out as 10 cm (width)×10 cm (length) to obtain a test specimen. The specimen was left at a temperature of 25° C. and a dew point temperature of −60° C. for 24 hours. The water content of the test specimen was subsequently measured by the Karl Fischer method (water vaporization method of JIS K-0068 (2001); vaporization temperature: 150° C.) using a coulometric titration water meter and was evaluated by the following standard. A smaller value for the water content indicates lower water content for the overall test specimen and the functional layer.

A: Water content of less than 250 mass ppm

B: Water content of not less than 250 mass ppm and less than 400 mass ppm

C: Water content of 400 mass ppm or more

<Heat Shrinkage Resistance>

A composition for a functional layer was applied onto a polyethylene separator substrate (produced by Asahi Kasei Corporation; product name: MD412) and was dried at 50° C. for 3 minutes to obtain a separator for evaluation including a functional layer (thickness: 0.5 μm) at one side.

A square of 12 cm×12 cm was cut out from the produced separator for evaluation, and then a square having a side length of 10 cm was drawn inside the cut-out square to obtain a test specimen. The test specimen was placed in a 130° C. thermostatic tank and was left for 1 hour. Thereafter, the change in area of the square drawn inside the test specimen (={(area of square before being left−area of square after being left)/area of square before being left}×100%) was calculated as the rate of heat shrinkage, and was evaluated by the following standard. A smaller rate of heat shrinkage indicates that the functional layer has better heat shrinkage resistance.

A: Rate of heat shrinkage of less than 5%

B: Rate of heat shrinkage of not less than 5% and less than 10%

C: Rate of heat shrinkage of 10% or more

<Cycle Characteristics>

A secondary battery was repeatedly charged to 4.35 V and discharged to 3 V by a 0.2 C constant-current method 100 times (=100 cycles) in a 25° C. atmosphere. The discharge capacity X1 of the 5$^{th}$ cycle and the discharge capacity X2 of the 100$^{th}$ cycle were measured, and a capacity maintenance rate (%) (=(X2/X1)×100) was calculated. This operation was performed for a total of 10 secondary batteries. An average value of the capacity maintenance rate (average capacity maintenance rate) was calculated and was evaluated by the following standard. A larger value for the average capacity maintenance rate indicates better secondary battery cycle characteristics.

A: Average capacity maintenance rate of 80% or more

B: Average capacity maintenance rate of not less than 70% and less than 80%

C: Average capacity maintenance rate of less than 70%

Example 1

<Production of Organic Particles>

A reactor A including a stirrer was charged with 0.1 parts of sodium dodecylbenzenesulfonate, 0.3 parts of ammonium persulfate, and 100 parts of deionized water. These materials were mixed to obtain a mixture and were heated to 80° C. Meanwhile, a monomer composition for seed particles was produced in a separate vessel by mixing 100 parts of n-butyl acrylate as a monofunctional (meth)acrylic acid ester monomer, 0.8 parts of sodium dodecylbenzenesulfonate, and 100 parts of deionized water. The monomer composition for seed particles was continuously added into the reactor A over 4 hours to carry out a polymerization reaction. Note that a temperature of 80° C. was maintained inside the reactor during continuous addition of the monomer composition for seed particles. Once this continuous addition was completed, the polymerization reaction was continued at 90° C. for 3 hours. As a result, a water dispersion of seed particles was obtained. Note that the volume-average particle diameter of the seed particles, measured in the same way as for organic particles, was 120 nm.

Next, a reactor including a stirrer was charged with 16 parts in terms of solid content of the water dispersion of seed particles, 82 parts of ethylene glycol dimethacrylate (produced by Kyoeisha Chemical Co., Ltd.; product name: LIGHT ESTER EG) as a polyfunctional monomer, 2 parts of acrylic acid as an acidic group-containing monomer, 2.5 parts of sodium dodecylbenzenesulfonate, 4.0 parts of t-butyl peroxy-2-ethylhexanoate (produced by NOF Corporation; product name: PERBUTYL O) as a polymerization initiator, and 200 parts of deionized water. These materials were stirred at 35° C. for 12 hours such that the polyfunctional monomer, the acidic group-containing monomer, and the polymerization initiator were completed absorbed by the seed particles. Thereafter, a temperature of 90° C. was maintained inside the reactor and a polymerization reaction (seeded polymerization) was carried out for 5 hours.

Next, steam was introduced into the reactor so as to remove unreacted monomer and initiator decomposition product, and thereby obtain a water dispersion of organic particles. The volume-average particle diameter and the glass-transition temperature of the obtained organic particles were measured. The results are shown in Table 1. Note that the glass-transition temperature was judged to be higher than 200° C. since a peak was not observed in the measurement temperature range (same applies for Examples 2 to 11).

<Preparation of Water-Soluble Polymer>

Polyvinyl alcohol (produced by Kuraray Co., Ltd.; product name: PVA 110) was prepared as a water-soluble polymer. This water-soluble polymer was added to deionized water and was stirred therewith at 80° C. for 1 hour to obtain an aqueous solution (solid content concentration: 5%) of the water-soluble polymer.

<Production of Binder>

A reactor B including a stirrer was charged with 70 parts of deionized water, 0.15 parts of sodium lauryl sulfate (produced by Kao Corporation; product name: EMAL 2F) as an emulsifier, and 0.5 parts of ammonium persulfate. The gas phase was purged with nitrogen gas and the temperature was raised to 60° C. Meanwhile, a monomer composition was obtained in a separate vessel by mixing 50 parts of deionized water, 0.7 parts of sodium dodecylbenzenesulfonate as a dispersant, and 96 parts of n-butyl acrylate, 2 parts of acrylonitrile, and 2 parts of methacrylic acid as monomers.

The monomer mixture was continuously added into the reactor B over 4 hours to carry out polymerization. The reaction was carried out at 60° C. during the continuous addition. Once the continuous addition was completed, a further 3 hours of stirring was performed at 70° C. to complete the reaction and yield a water dispersion of a binder (acrylic polymer).

The obtained binder had a volume-average particle diameter of 200 nm and a glass-transition temperature of −35° C.

<Production of Composition for Functional Layer>

Mixing of 100 parts (in terms of solid content) of the organic particles and 5 parts (in terms of solid content) of the water-soluble polymer was performed inside a stirring vessel, and 10 parts (in terms of solid content) of the binder was further added and mixed therewith. Deionized water was added to the resultant mixture to produce a composition for a functional layer (solid content concentration: 10%). The obtained composition for a functional layer was used to evaluate coating stability and slurry stability, and also to evaluate water content and heat shrinkage resistance of a functional layer. The results are shown in Table 1.

<Production of Separator Including Functional Layer at Both Sides>

The composition for a functional layer was applied onto a polyethylene separator substrate (produced by Asahi Kasei Corporation; product name: MD412) and was dried at 50° C. for 3 minutes to form a functional layer (thickness: 0.5 μm). The composition for a functional layer was also applied onto the other side of the separator substrate and was dried on the separator substrate at 50° C. for 3 minutes to form a functional layer (thickness: 0.5 μm) and thereby produce a separator including a functional layer at both sides.

<Production of Negative Electrode>

A 5 MPa pressure vessel equipped with a stirrer was charged with 33 parts of 1,3-butadiene, 3.5 parts of itaconic acid, 63.5 parts of styrene, 0.4 parts of sodium dodecylbenzenesulfonate as an emulsifier, 150 parts of deionized water, and 0.5 parts of potassium persulfate as a polymerization initiator. These materials were sufficiently stirred and were then heated to 50° C. to initiate polymerization. At the point at which the polymerization conversion rate reached 96%, cooling was performed to terminate the reaction and yield a mixture containing a binder (SBR) for a negative electrode. The mixture containing the binder for a negative electrode was adjusted to pH 8 through addition of 5% sodium hydroxide aqueous solution and was then subjected to thermal-vacuum distillation to remove unreacted monomer. Next, the mixture was cooled to 30° C. or lower to obtain a water dispersion containing the target binder for a negative electrode.

After combining 100 parts of artificial graphite (volume-average particle diameter: 15.6 μm) as a negative electrode active material and 1 part (in terms of solid content) of a 2% aqueous solution of a sodium salt of carboxymethyl cellulose (produced by Nippon Paper Industries Co., Ltd.; product name: MAC350HC) as a thickener, these materials were adjusted to a solid content concentration of 68% with deionized water and were then mixed at 25° C. for 60 minutes. Next, deionized water was used to adjust the solid content concentration to 62% and further mixing was performed at 25° C. for 15 minutes. Deionized water and 1.5 parts in terms of solid content of the binder for a negative electrode were added to the resultant mixture, the final solid content concentration was adjusted to 52%, and a further 10 minutes of mixing was performed. The resultant mixture was subjected to a defoaming process under reduced pressure to yield a slurry composition for a negative electrode having good fluidity.

The slurry composition for a negative electrode that was obtained as described above was applied onto copper foil (current collector) of 20 μm in thickness using a comma coater such as to have a thickness after drying of approximately 150 μm. The applied slurry composition was dried by conveying the copper foil inside a 60° C. oven for 2 minutes at a speed of 0.5 m/min. Thereafter, 2 minutes of heat treatment was performed at 120° C. to obtain a pre-pressing negative electrode web. The pre-pressing negative electrode web was rolled by roll pressing to obtain a post-pressing negative electrode (single-sided negative electrode) having a negative electrode mixed material layer thickness of 80 μm.

<Production of Positive Electrode>

A slurry composition for a positive electrode (solid content concentration: 70%) was obtained by mixing 100 parts of $LiCoO_2$ (volume-average particle diameter: 12 μm) as a positive electrode active material, 2 parts of acetylene black (produced by Denka Company Limited; product name: HS-100) as a conductive material, 2 parts (in terms of solid content) of PVDF (produced by Kureha Corporation; product name: #7208) as a binder for a positive electrode, and NMP using a planetary mixer.

The slurry composition for a positive electrode obtained as described above was applied onto aluminum foil (current collector) of 20 μm in thickness using a comma coater such as to have a thickness after drying of approximately 150 μm. The applied slurry composition was dried by conveying the aluminum foil inside a 60° C. oven for 2 minutes at a speed of 0.5 m/min. Thereafter, 2 minutes of heat treatment was performed at 120° C. to obtain a pre-pressing positive electrode web. The pre-pressing positive electrode web was rolled by roll pressing to obtain a post-pressing positive electrode (single-sided positive electrode) having a positive electrode mixed material layer thickness of 80 μm.

<Production of Secondary Battery>

The post-pressing positive electrode obtained as described above was cut out as 49 cm×5 cm and was placed on a stage with the surface at the positive electrode mixed material layer side thereof facing upward. A separator that have been cut out as 120 cm×5.5 cm was positioned on the positive electrode mixed material layer of the positive electrode. In addition, the negative electrode obtained as described above was cut out as 50 cm×5.2 cm and was positioned on the separator such that the surface at the negative electrode active material layer side thereof faced toward the separator. In this manner, a laminate was obtained. The laminate was wound using a winding machine to obtain a roll. The roll was then pressed into a flattened form at 60° C. and 0.5 MPa. The flattened product was enclosed in an aluminum packing case serving as a battery case, and electrolyte solution (solvent: ethylene carbonate/diethyl carbonate/vinylene carbonate (volume mixing ratio) =68.5/30/1.5; electrolyte: $LiPF_6$ of 1 M in concentration) was injected such that no air remained. Next, the aluminum case was closed by heat sealing at 150° C. in order to seal an opening of the aluminum packing. The roll and the aluminum packing case were then pressed at 60° C. and 0.5 MPa to produce a 1,000 mAh wound-type lithium ion secondary battery. Cycle characteristics of the obtained lithium ion secondary battery were evaluated. The result is shown in Table 1.

Examples 2, 3, and 7

Organic particles, a binder, a composition for a functional layer, a separator, a negative electrode, a positive electrode, and a secondary battery were produced in the same way as in Example 1 with the exception that polyvinyl alcohol "PVA 117" (product name; produced by Kuraray Co., Ltd.) (Example 2), polyvinyl alcohol "PVA 105" (product name; produced by Kuraray Co., Ltd.) (Example 3), or polyvinyl alcohol "PVA 210" (product name; produced by Kuraray Co., Ltd.) (Example 7) was used as a water-soluble polymer instead of polyvinyl alcohol "PVA 110" (product name; produced by Kuraray Co., Ltd.). Each evaluation was also performed in the same way as in Example 1. The results are shown in Table 1.

Example 4

A water-soluble polymer was prepared, and a binder, a composition for a functional layer, a separator, a negative electrode, a positive electrode, and a secondary battery were produced in the same way as in Example 1 with the exception that organic particles produced as described below were used. Each evaluation was also performed in the same way as in Example 1. The results are shown in Table 1.
<Production of Organic Particles>
A reactor A including a stirrer was charged with 0.1 parts of sodium dodecylbenzenesulfonate, 0.3 parts of ammonium persulfate, and 100 parts of deionized water. These materials were mixed to obtain a mixture and were heated to 80° C. Meanwhile, a monomer composition for seed particles was produced in a separate vessel by mixing 100 parts of n-butyl acrylate as a monofunctional (meth)acrylic acid ester monomer, 0.6 parts of sodium dodecylbenzenesulfonate, and 100 parts of deionized water. The monomer composition for seed particles was continuously added into the reactor A over 4 hours to carry out a polymerization reaction. Note that a temperature of 80° C. was maintained inside the reactor during continuous addition of the monomer composition for seed particles. Once this continuous addition was completed, the polymerization reaction was continued at 90° C. for 3 hours. As a result, a water dispersion of seed particles was obtained. Note that the volume-average particle diameter of the seed particles, measured in the same way as for organic particles, was 160 nm.

Next, a reactor including a stirrer was charged with 48 parts in terms of solid content of the water dispersion of the seed particles described above, 50 parts of ethylene glycol dimethacrylate (produced by Kyoeisha Chemical Co., Ltd.; product name: LIGHT ESTER EG) as a polyfunctional monomer, 2 parts of acrylic acid as an acidic group-containing monomer, 2.5 parts of sodium dodecylbenzenesulfonate, 4.0 parts of t-butyl peroxy-2-ethylhexanoate (produced by NOF Corporation; product name: PERBUTYL O) as a polymerization initiator, and 200 parts of deionized water. These materials were stirred at 35° C. for 12 hours such that the polyfunctional monomer, the acidic group-containing monomer, and the polymerization initiator were completely absorbed by the seed particles. Thereafter, a temperature of 90° C. was maintained inside the reactor and a polymerization reaction (seeded polymerization) was carried out for 5 hours.

Next, steam was introduced into the reactor so as to remove unreacted monomer and initiator decomposition product, and thereby obtain a water dispersion of organic particles.

Example 5

A water-soluble polymer was prepared, and a binder, a composition for a functional layer, a separator, a negative electrode, a positive electrode, and a secondary battery were produced in the same way as in Example 1 with the exception that organic particles produced as described below were used. Each evaluation was also performed in the same way as in Example 1. The results are shown in Table 1.
<Production of Organic Particles>
A reactor A including a stirrer was charged with 0.1 parts of sodium dodecylbenzenesulfonate, 0.3 parts of ammonium persulfate, and 100 parts of deionized water. These materials were mixed to obtain a mixture and were heated to 80° C. Meanwhile, a monomer composition for seed particles was produced in a separate vessel by mixing 100 parts of n-butyl acrylate as a monofunctional (meth)acrylic acid ester monomer, 0.4 parts of sodium dodecylbenzenesulfonate, and 100 parts of deionized water. The monomer composition for seed particles was continuously added into the reactor A over 4 hours to carry out a polymerization reaction. Note that a temperature of 80° C. was maintained inside the reactor during continuous addition of the monomer composition for seed particles. Once this continuous addition was completed, the polymerization reaction was continued at 90° C. for 3 hours. As a result, a water dispersion of seed particles was obtained. Note that the volume-average particle diameter of the seed particles, measured in the same way as for organic particles, was 200 nm.

Next, a reactor including a stirrer was charged with 73 parts in terms of solid content of the water dispersion of the seed particles described above, 25 parts of ethylene glycol dimethacrylate (produced by Kyoeisha Chemical Co., Ltd.; product name: LIGHT ESTER EG) as a polyfunctional monomer, 2 parts of acrylic acid as an acidic group-containing monomer, 2.5 parts of sodium dodecylbenzenesulfonate, 4.0 parts of t-butyl peroxy-2-ethylhexanoate (produced by NOF Corporation; product name: PERBUTYL O) as a polymerization initiator, and 200 parts of deionized water. These materials were stirred at 35° C. for 12 hours such that the polyfunctional monomer, the acidic group-containing monomer, and the polymerization initiator were completely absorbed by the seed particles. Thereafter, a temperature of 90° C. was maintained inside the reactor and a polymerization reaction (seeded polymerization) was carried out for 5 hours.

Next, steam was introduced into the reactor so as to remove unreacted monomer and initiator decomposition product, and thereby obtain a water dispersion of organic particles.

Example 6

Organic particles, a binder, a composition for a functional layer, a separator, a negative electrode, a positive electrode, and a secondary battery were produced in the same way as in Example 1 with the exception that a water-soluble polymer produced as described below was used. Each evaluation was also performed in the same way as in Example 1. The results are shown in Table 1.
<Production of Water-Soluble Polymer>
A four-necked flask including a stirrer, a thermometer, a reflux condenser, and a nitrogen gas feeding tube was charged with 35 parts of 2-hydroxyethyl acrylamide as a hydroxyl group-containing monomer, 35 parts of acrylamide as a (meth)acrylamide monomer, 30 parts of acrylic acid as an acidic group-containing monomer, 365 parts of deionized water, and 5 parts of isopropyl alcohol. Oxygen in the reaction system was removed using nitrogen gas. Next, 7 parts of 5% ammonium persulfate aqueous solution and 3 parts of 5% sodium bisulfite aqueous solution as polymerization initiators were added into the flask under stirring. The temperature was subsequently raised from room temperature to 80° C. and was maintained at 80° C. for 3 hours. Thereafter, 162 parts of deionized water was added and the pH was adjusted to 5 with 48% caustic soda. Further deionized water was added to obtain an aqueous solution (solid content concentration: 5%) of a water-soluble polymer.

Example 8

A water-soluble polymer was prepared, and a binder, a composition for a functional layer, a separator, a negative electrode, a positive electrode, and a secondary battery were produced in the same way as in Example 1 with the exception that organic particles produced as described below were used. Each evaluation was also performed in the same way as in Example 1. The results are shown in Table 1.
<Production of Organic Particles>

A reactor A including a stirrer was charged with 0.05 parts of sodium dodecylbenzenesulfonate, 0.3 parts of ammonium persulfate, and 100 parts of deionized water. These materials were mixed to obtain a mixture and were heated to 80° C. Meanwhile, a monomer composition for seed particles was produced in a separate vessel by mixing 100 parts of n-butyl acrylate as a monofunctional (meth)acrylic acid ester monomer, 0.4 parts of sodium dodecylbenzenesulfonate, and 100 parts of deionized water. The monomer composition for seed particles was continuously added into the reactor A over 4 hours to carry out a polymerization reaction. Note that a temperature of 80° C. was maintained inside the reactor during continuous addition of the monomer composition for seed particles. Once this continuous addition was completed, the polymerization reaction was continued at 90° C. for 3 hours. As a result, a water dispersion of seed particles was obtained. Note that the volume-average particle diameter of the seed particles, measured in the same way as for organic particles, was 380 nm.

Next, a reactor including a stirrer was charged with 16 parts in terms of solid content of the water dispersion of the seed particles described above, 82 parts of ethylene glycol dimethacrylate (produced by Kyoeisha Chemical Co., Ltd.; product name: LIGHT ESTER EG) as a polyfunctional monomer, 2 parts of acrylic acid as an acidic group-containing monomer, 2.5 parts of sodium dodecylbenzenesulfonate, 4.0 parts of t-butyl peroxy-2-ethylhexanoate (produced by NOF Corporation; product name: PERBUTYL O) as a polymerization initiator, and 200 parts of deionized water. These materials were stirred at 35° C. for 12 hours such that the polyfunctional monomer, the acidic group-containing monomer, and the polymerization initiator were completely absorbed by the seed particles. Thereafter, a temperature of 90° C. was maintained inside the reactor and a polymerization reaction (seeded polymerization) was carried out for 5 hours.

Next, steam was introduced into the reactor so as to remove unreacted monomer and initiator decomposition product, and thereby obtain a water dispersion of organic particles.

Example 9

A water-soluble polymer was prepared, and organic particles, a binder, a composition for a functional layer, a separator, a negative electrode, a positive electrode, and a secondary battery were produced in the same way as in Example 1 with the exception that a composition for a functional layer produced as described below was used. Each evaluation was also performed in the same way as in Example 1. The results are shown in Table 2.
<Production of Composition for Functional Layer>

Mixing of 70 parts (in terms of solid content) of the organic particles, 30 parts of alumina particles (produced by Sumitomo Chemical Co., Ltd.; product name: AKP-30) as inorganic particles, and 5 parts (in terms of solid content) of the water-soluble polymer was performed inside a stirring vessel, and then 10 parts (in terms of solid content) of the binder was added and mixed therewith. Deionized water was added to the resultant mixture to produce a composition for a functional layer (solid content concentration: 10%).

Example 10

<Production of Organic Particles, Water-Soluble Polymer, Binder, and Composition for Functional Layer>

Organic particles, a binder, and a composition for a functional layer were produced in the same way as in Example 1. Each evaluation was also performed as previously described. The results are shown in Table 2.
<Preparation of Separator>

A polyethylene separator (produced by Asahi Kasei Corporation;
product name: MD412) was prepared.
<Production of Negative Electrode Including Functional Layer>

A binder for a negative electrode and a slurry composition for a negative electrode were produced in the same way as in Example 1. The slurry composition for a negative electrode that was obtained was applied onto copper foil (current collector) of 20 μm in thickness using a comma coater such as to have a thickness after drying of approximately 150 μm. The applied slurry composition was dried by conveying the copper foil inside a 60° C. oven for 2 minutes at a speed of 0.5 m/min. Thereafter, 2 minutes of heat treatment was performed at 120° C. to obtain a pre-pressing negative electrode web. The pre-pressing negative electrode web was rolled by roll pressing to obtain a negative electrode substrate having a negative electrode mixed material layer thickness of 80 μm.

The composition for a functional layer obtained as described above was applied onto the surface at the negative electrode mixed material layer side of the negative electrode substrate and was dried on the negative electrode substrate at 50° C. for 3 minutes to form a functional layer (thickness: 0.5 μm) and thereby obtain a negative electrode including the functional layer.
<Production of Positive Electrode>

A positive electrode was produced in the same way as in Example 1.
<Production of Secondary Battery>

The post-pressing positive electrode obtained as described above was cut out as 49 cm×5 cm and was placed on a stage with the surface at the positive electrode mixed material layer side thereof facing upward. A separator that had been cut out as 120 cm×5.5 cm was positioned on the positive electrode mixed material layer of the positive electrode. In addition, the negative electrode obtained as described above was cut out as 50 cm×5.2 cm and was positioned on the separator such that the surface at the functional layer side thereof faced toward the separator. In this manner, a laminate was obtained. The laminate was wound using a winding machine to obtain a roll. The roll was then pressed into a flattened form at 60° C. and 0.5 MPa. The flattened product was enclosed in an aluminum packing case serving as a battery case, and electrolyte solution (solvent: ethylene carbonate/diethyl carbonate/vinylene carbonate (volume mixing ratio)=68.5/30/1.5; electrolyte: LiPF$_6$ of 1 M in concentration) was injected such that no air remained. Next, the aluminum case was closed by heat sealing at 150° C. in order to seal an opening of the aluminum packing. The roll and the aluminum packing case were then pressed at 60° C. and 0.5 MPa to produce a 1,000 mAh wound-type lithium ion secondary battery. Cycle characteristics of the obtained lithium ion secondary battery were evaluated. The result is shown in Table 2.

Example 11

Organic particles, a binder, a composition for a functional layer, a separator, a negative electrode, a positive electrode, and a secondary battery were produced in the same way as in Example 1 with the exception that trimethylolpropane trimethacrylate was used instead of ethylene glycol dimethacrylate in production of the organic particles. Each evaluation was also performed in the same way as in Example 1. The results are shown in Table 2.

Comparative Example 1

Organic particles, a binder, a composition for a functional layer, a separator, a negative electrode, a positive electrode, and a secondary battery were produced in the same way as in Example 1 with the exception that a water-soluble polymer produced as described below was used. Each evaluation was also performed in the same way as in Example 1. The results are shown in Table 2.
<Production of Water-Soluble Polymer>
A four-necked flask including a stirrer, a thermometer, a reflux condenser, and a nitrogen gas feeding tube was charged with 1 part of dimethylacrylamide and 90 parts of acrylamide as (meth)acrylamide monomers, 9 parts of methacrylic acid as an acidic group-containing monomer, 365 parts of deionized water, and 5 parts of isopropyl alcohol. Oxygen in the reaction system was removed using nitrogen gas. Next, 7 parts of 5% ammonium persulfate aqueous solution and 3 parts of 5% sodium bisulfite aqueous solution as polymerization initiators were added into the flask under stirring. The temperature was subsequently raised from room temperature to 80° C. and was maintained at 80° C. for 3 hours. Thereafter, 162 parts of deionized water was added and the pH was adjusted to 5 with 48% caustic soda. Further deionized water was added to obtain an aqueous solution (solid content concentration: 5%) of a water-soluble polymer.

Comparative Examples 2 and 3

Organic particles, a binder, a composition for a functional layer, a separator, a negative electrode, a positive electrode, and a secondary battery were produced in the same way as in Example 1 with the exception that sodium polyacrylate (produced by Toagosei Co., Ltd.; product name: ARON A-30) (Comparative Example 2) or imidized isobutyl-maleic acid copolymer (produced by Kuraray Co., Ltd.; product name: ISOBAM 304) (Comparative Example 3) was used as a water-soluble polymer instead of polyvinyl alcohol (produced by Kuraray Co., Ltd.; product name: PVA 110). Each evaluation was also performed in the same way as in Example 1. The results are shown in Table 2.

Comparative Example 4

A water-soluble polymer was prepared, and a binder, a composition for a functional layer, a separator, a negative electrode, a positive electrode, and a secondary battery were produced in the same way as in Example 1 with the exception that organic particles produced as described below were used. Each evaluation was also performed in the same way as in Example 1. The results are shown in Table 2.
<Production of Organic Particles>
A reactor A including a stirrer was charged with 0.05 parts of sodium dodecylbenzenesulfonate, 0.3 parts of ammonium persulfate, and 100 parts of deionized water. These materials were mixed to obtain a mixture and were heated to 80° C. Meanwhile, a monomer composition was produced in a separate vessel by mixing 5 parts of ethylene glycol dimethacrylate (produced by Kyoeisha Chemical Co., Ltd.; product name: LIGHT ESTER EG) as a polyfunctional monomer, 93 parts of methyl methacrylate as a monofunctional (meth)acrylic acid ester monomer, 2 parts of acrylic acid as an acidic group-containing monomer, 0.5 parts of sodium dodecylbenzenesulfonate, and 100 parts of deionized water. The monomer composition was continuously added to the mixture obtained as described above over 4 hours to carry out polymerization. During continuous addition of the monomer composition, the temperature of the reaction system was maintained at 80° C. while carrying out a reaction. Once the continuous addition was completed, the reaction was continued at 90° C. for 3 hours to yield a water dispersion of organic particles.

In Tables 1 and 2, shown below:
"EDMA" indicates ethylene glycol dimethacrylate unit;
"TMPTMA" indicates trimethylolpropane trimethacrylate unit;
"BA" indicates n-butyl acrylate unit;
"MMA" indicates methyl methacrylate unit;
"AA" indicates acrylic acid unit;
"VAL" indicates vinyl alcohol unit;
"HEAAm" indicates 2-hydroxyethyl acrylamide unit;
"VAc" indicates vinyl acetate unit;
"AAm" indicates acrylamide unit;
"DMAA" indicates dimethylacrylamide unit;
"SPA" indicates sodium polyacrylate;
"IIM" indicates imidized isobutyl-maleic acid copolymer; and
"ACL" indicates acrylic polymer.

TABLE 1

| | | | | | | Example 1 | Example 2 | Example 3 | Example 4 |
|---|---|---|---|---|---|---|---|---|---|
| Composition for functional layer | Organic particles | Battery component including functional layer | | | | Separator | Separator | Separator | Separator |
| | | Chemical composition | Polyfunctional monomer unit | | Type | EDMA | EDMA | EDMA | EDMA |
| | | | | | Proportion [mass %] | 82 | 82 | 82 | 50 |
| | | | Monofunctional (meth)acrylic acid ester monomer unit | | Type | BA | BA | BA | BA |
| | | | | | Proportion [mass %] | 16 | 16 | 16 | 48 |
| | | | Acidic group-containing monomer unit | | Type | AA | AA | AA | AA |
| | | | | | Proportion [mass %] | 2 | 2 | 2 | 2 |
| | | Volume-average particle diameter [nm] | | | | 230 | 230 | 230 | 230 |
| | | [Tg° C.] | | | | ≥200 | ≥200 | ≥200 | ≥200 |
| | | Amount [parts by mass] | | | | 100 | 100 | 100 | 100 |

TABLE 1-continued

|  |  |  |  |  |  |  |  |  |
|---|---|---|---|---|---|---|---|---|
| Water-soluble polymer | Chemical composition | Electrical character in water | | Non-ionic | Non-ionic | Non-ionic | Non-ionic |
| | | Hydroxyl group-containing structural unit | Type | VAL | VAL | VAL | VAL |
| | | | Proportion [mass %] | 97 | 97 | 97 | 97 |
| | | Carboxylic acid vinyl ester monomer unit | Type | VAc | VAc | VAc | VAc |
| | | | Proportion [mass %] | 3 | 3 | 3 | 3 |
| | | Acidic group-containing monomer unit | Type | — | — | — | — |
| | | | Proportion [mass %] | — | — | — | — |
| | | (Meth) acrylamide monomer unit | Type | — | — | — | — |
| | | | Proportion [mass %] | — | — | — | — |
| | | Degree of saponification [mol %] | | 99 | 99 | 99 | 99 |
| | | Weight-average molecular weight [−] | | 45000 | 75000 | 22000 | 45000 |
| | | Amount [parts by mass] | | 5 | 5 | 5 | 5 |
| Binder | | Type | | ACL | ACL | ACL | ACL |
| | | Amount [parts by mass] | | 10 | 10 | 10 | 10 |
| Inorganic particles | | Type | | — | — | — | — |
| | | Amount [parts by mass] | | — | — | — | — |
| Functional layer thickness [μm] | | | | 0.5 | 0.5 | 0.5 | 0.5 |
| Water content | | | | A | A | A | A |
| Heat shrinkage resistance | | | | A | A | B | A |
| Coating stability | | | | A | B | A | A |
| Slurry stability | | | | A | A | A | A |
| Cycle characteristics | | | | A | A | A | A |

|  |  |  |  |  | Example 5 | Example 6 | Example 7 | Example 8 |
|---|---|---|---|---|---|---|---|---|
| | | Battery component including functional layer | | | Separator | Separator | Separator | Separator |
| Composition for functional layer | Organic particles | Chemical composition | Polyfunctional monomer unit | Type | EDMA | EDMA | EDMA | EDMA |
| | | | | Proportion [mass %] | 25 | 82 | 82 | 82 |
| | | | Monofunctional (meth)acrylic acid ester monomer unit | Type | BA | BA | BA | BA |
| | | | | Proportion [mass %] | 73 | 16 | 16 | 16 |
| | | | Acidic group-containing monomer unit | Type | AA | AA | AA | AA |
| | | | | Proportion [mass %] | 2 | 2 | 2 | 2 |
| | | Volume-average particle diameter [nm] | | | 230 | 230 | 230 | 700 |
| | | [Tg° C.] | | | ≥200 | ≥200 | ≥200 | ≥200 |
| | | Amount [parts by mass] | | | 100 | 100 | 100 | 100 |
| | Water-soluble polymer | Chemical composition | Electrical character in water | | Non-ionic | Anionic | Non-ionic | Non-ionic |
| | | | Hydroxyl group-containing structural unit | Type | VAL | HEAAm | VAL | VAL |
| | | | | Proportion [mass %] | 97 | 35 | 79 | 97 |
| | | | Carboxylic acid vinyl ester monomer unit | Type | VAc | — | VAc | VAc |
| | | | | Proportion [mass %] | 3 | — | 21 | 3 |
| | | | Acidic group-containing monomer unit | Type | — | AA | — | — |
| | | | | Proportion [mass %] | — | 30 | — | — |
| | | | (Meth) acrylamide monomer unit | Type | — | AAm | — | — |
| | | | | Proportion [mass %] | — | 35 | — | — |
| | | | Degree of saponification [mol %] | | 99 | — | 88 | 99 |
| | | | Weight-average molecular weight [−] | | 45000 | 60000 | 45000 | 45000 |
| | | | Amount [parts by mass] | | 5 | 5 | 5 | 5 |
| | Binder | | Type | | ACL | ACL | ACL | ACL |
| | | | Amount [parts by mass] | | 10 | 10 | 10 | 10 |
| | Inorganic particles | | Type | | — | — | — | — |
| | | | Amount [parts by mass] | | — | — | — | — |
| | Functional layer thickness [μm] | | | | 0.5 | 0.5 | 0.5 | 0.5 |
| | Water content | | | | A | B | A | A |
| | Heat shrinkage resistance | | | | B | A | A | B |
| | Coating stability | | | | A | A | B | B |
| | Slurry stability | | | | A | B | A | A |
| | Cycle characteristics | | | | A | B | B | A |

TABLE 2

|  |  |  |  |  |  | Example 9 | Example 10 | Example 11 | Comparative Example 1 |
|---|---|---|---|---|---|---|---|---|---|
| | | Battery component including functional layer | | | | Separator | Negative electrode | Separator | Separator |
| Composition for functional layer | Organic particles | Chemical composition | Polyfunctional monomer unit | Type | | EDMA | EDMA | TMPTMA | EDMA |
| | | | | Proportion [mass %] | | 82 | 82 | 82 | 82 |
| | | | Monofunctional (meth) acrylic acid ester monomer unit | Type | | BA | BA | BA | BA |
| | | | | Proportion [mass %] | | 16 | 16 | 16 | 16 |
| | | | Acidic group-containing monomer unit | Type | | AA | AA | AA | AA |
| | | | | Proportion [mass %] | | 2 | 2 | 2 | 2 |
| | | Volume-average particle diameter [nm] | | | | 230 | 230 | 230 | 230 |
| | | [Tg° C.] | | | | ≥200 | ≥200 | ≥200 | ≥200 |
| | | Amount [parts by mass] | | | | 70 | 100 | 100 | 100 |

TABLE 2-continued

| Water-soluble polymer | Chemical composition | Electrical character in water | | Non-ionic | Non-ionic | Non-ionic | Anionic |
|---|---|---|---|---|---|---|---|
| | | Hydroxyl group-containing structural unit | Type | VAL | VAL | VAL | — |
| | | | Proportion [mass %] | 97 | 97 | 97 | — |
| | | Carboxylic acid vinyl ester monomer unit | Type | VAc | VAc | VAc | — |
| | | | Proportion [mass %] | 3 | 3 | 3 | — |
| | | Acidic group-containing monomer unit | Type | — | — | — | MAA |
| | | | Proportion [mass %] | — | — | — | 9 |
| | | (Meth)acrylamide monomer unit | Type | — | — | — | AAm/DMAA |
| | | | Proportion [mass %] | — | — | — | 90/1 |
| | | Degree of saponification [mol %] | | 99 | 99 | 99 | — |
| | | Weight-average molecular weight [−] | | 45000 | 45000 | 45000 | 150000 |
| | | Amount [parts by mass] | | 5 | 5 | 5 | 5 |
| Binder | | Type | | ACL | ACL | ACL | ACL |
| | | Amount [parts by mass] | | 10 | 10 | 10 | 10 |
| Inorganic particles | | Type | | Alumina | — | — | — |
| | | Amount [parts by mass] | | 30 | — | — | — |
| | | Functional layer thickness [μm] | | 0.5 | 0.5 | 0.5 | 0.5 |
| | | Water content | | B | A | A | B |
| | | Heat shrinkage resistance | | A | A | A | B |
| | | Coating stability | | A | A | A | B |
| | | Slurry stability | | B | A | A | C |
| | | Cycle characteristics | | B | A | A | B |

| | | | | | Comparative Example 2 | Comparative Example 3 | Comparative Example 4 |
|---|---|---|---|---|---|---|---|
| | | Battery component including functional layer | | | Separator | Separator | Separator |
| Composition for functional layer | Organic particles | Chemical composition | Polyfunctional monomer unit | Type | EDMA | EDMA | EDMA |
| | | | | Proportion [mass %] | 82 | 82 | 5 |
| | | | Monofunctional (meth) acrylic acid ester monomer unit | Type | BA | BA | MMA |
| | | | | Proportion [mass %] | 16 | 16 | 93 |
| | | | Acidic group-containing monomer unit | Type | AA | AA | AA |
| | | | | Proportion [mass %] | 2 | 2 | 2 |
| | | Volume-average particle diameter [nm] | | | 230 | 230 | 230 |
| | | [Tg° C.] | | | ≥200 | ≥200 | 105 |
| | | Amount [parts by mass] | | | 100 | 100 | 100 |
| | Water-soluble polymer | Chemical composition | Electrical character in water | | Anionic | Anionic | Non-ionic |
| | | | Hydroxyl group-containing structural unit | Type | SPA | IIM | VAL |
| | | | | Proportion [mass %] | | | 97 |
| | | | Carboxylic acid vinyl ester monomer unit | Type | | | VAc |
| | | | | Proportion [mass %] | | | 3 |
| | | | Acidic group-containing monomer unit | Type | | | — |
| | | | | Proportion [mass %] | | | — |
| | | | (Meth)acrylamide monomer unit | Type | | | — |
| | | | | Proportion [mass %] | | | — |
| | | | Degree of saponification [mol %] | | — | — | 99 |
| | | | Weight-average molecular weight [−] | | 100000 | 60000 | 45000 |
| | | | Amount [parts by mass] | | 5 | 5 | 5 |
| | Binder | | Type | | ACL | ACL | ACL |
| | | | Amount [parts by mass] | | 10 | 10 | 10 |
| | Inorganic particles | | Type | | — | — | — |
| | | | Amount [parts by mass] | | — | — | — |
| | | | Functional layer thickness [μm] | | 0.5 | 0.5 | 0.5 |
| | | | Water content | | B | B | A |
| | | | Heat shrinkage resistance | | B | B | C |
| | | | Coating stability | | A | A | A |
| | | | Slurry stability | | C | C | A |
| | | | Cycle characteristics | | B | B | B |

It can be seen from Tables 1 and 2 that in Examples 1 to 11 in which the used composition for a functional layer contained, in water, organic particles including a polyfunctional monomer unit in a proportion of not less than 20 mass % and not more than 95 mass % and a water-soluble polymer including a hydroxyl group-containing structural unit in a proportion of not less than 15 mass % and not more than 100 mass %, the composition for a functional layer had excellent slurry stability, and a functional layer having excellent heat shrinkage resistance could be formed using the composition for a functional layer. It can also be seen that in Examples 1 to 11, coating stability of the composition for a functional layer could be ensured while also reducing the amount of water imported into a secondary battery, and causing a secondary battery to display good cycle characteristics.

In contrast, it can be seen that in Comparative Examples 1 to 3 in which the used composition for a functional layer contained a water-soluble polymer in which the fractional content of a hydroxyl group-containing structural unit was less than 15 mass %, slurry stability of the composition for a functional layer decreased.

It can also be seen that heat shrinkage resistance of a functional layer decreased in Comparative Example 4 in which the used composition for a functional layer contained organic particles in which the fractional content of a polyfunctional monomer unit was less than 20 mass %.

INDUSTRIAL APPLICABILITY

According to the present disclosure, it is possible to provide a composition for a non-aqueous secondary battery functional layer that has excellent slurry stability and can form a functional layer for which sufficient heat shrinkage resistance is ensured.

Moreover, according to the present disclosure, it is possible to provide a functional layer for a non-aqueous secondary battery having excellent heat shrinkage resistance, a non-aqueous secondary battery component including the functional layer, and a non-aqueous secondary battery including the battery component.

The invention claimed is:

1. A composition for a non-aqueous secondary battery functional layer comprising organic particles, a water-soluble polymer, and water, wherein
the organic particles include a polyfunctional monomer unit in a proportion of not less than 20 mass % and not more than 95 mass %,
the water-soluble polymer includes a hydroxyl group-containing structural unit in a proportion of not less than 15 mass % and not more than 100 mass %, and
the organic particles have a glass-transition temperature of 100° C. or higher.

2. The composition for a non-aqueous secondary battery functional layer according to claim 1, wherein the water-soluble polymer is non-ionic.

3. The composition for a non-aqueous secondary battery functional layer according to claim 1, wherein the water-soluble polymer has a degree of saponification of not less than 80 mol % and not more than 100 mol %.

4. The composition for a non-aqueous secondary battery functional layer according to claim 1, wherein the water-soluble polymer has a weight-average molecular weight of not less than 10,000 and not more than 300,000.

5. The composition for a non-aqueous secondary battery functional layer according to claim 1, wherein the polyfunctional monomer unit is a polyfunctional ethylenically unsaturated monomer unit.

6. The composition for a non-aqueous secondary battery functional layer according to claim 1, wherein the organic particles have a volume-average particle diameter of not less than 50 nm and not more than 500 nm.

7. A functional layer for a non-aqueous secondary battery comprising a dried product of the composition for a non-aqueous secondary battery functional layer according to claim 1.

8. A non-aqueous secondary battery component comprising the functional layer for a non-aqueous secondary battery according to claim 7.

9. A non-aqueous secondary battery comprising the non-aqueous secondary battery component according to claim 8.

10. A composition for a non-aqueous secondary battery functional layer comprising organic particles, a water-soluble polymer, and water, wherein
the organic particles include a polyfunctional monomer unit in a proportion of not less than 20 mass % and not more than 95 mass %,
the water-soluble polymer includes a hydroxyl group-containing structural unit in a proportion of not less than 15 mass % and not more than 100 mass %, and
the organic particles have a volume-average particle diameter of not less than 50 nm and not more than 500 nm.

11. The composition for a non-aqueous secondary battery functional layer according to claim 10, wherein the water-soluble polymer is non-ionic.

12. The composition for a non-aqueous secondary battery functional layer according to claim 10, wherein the water-soluble polymer has a degree of saponification of not less than 80 mol % and not more than 100 mol %.

13. The composition for a non-aqueous secondary battery functional layer according to claim 10, wherein the water-soluble polymer has a weight-average molecular weight of not less than 10,000 and not more than 300,000.

14. The composition for a non-aqueous secondary battery functional layer according to claim 1, wherein the polyfunctional monomer unit is a polyfunctional ethylenically unsaturated monomer unit.

15. A functional layer for a non-aqueous secondary battery comprising a dried product of the composition for a non-aqueous secondary battery functional layer according to claim 10.

16. A non-aqueous secondary battery component comprising the functional layer for a non-aqueous secondary battery according to claim 15.

17. A non-aqueous secondary battery comprising the non-aqueous secondary battery component according to claim 16.

* * * * *